Patented June 16, 1942

2,286,314

UNITED STATES PATENT OFFICE 2,286,314

PLASTICIZER

George W. Seymour and Blanche B. White, Cumberland, Md., assignors to Celanese Corporation of America, a corporation of Delaware No Drawing. Application April 5, 1940, Serial No. 327,994

8 Claims. (Cl. 106—188)

This invention relates to the preparation of various polyglycol ethers and polyglycol halo-ethers, and relates more particularly to compositions containing derivatives of cellulose and said polyglycol ethers and halo-ethers as plasticizers or softening agents therefor.

An object of this invention is the preparation of ethers of various polyglycols such as diethylene glycol, triethylene glycol and tetra-ethylene glycol.

A further object of this invention is the preparation of compositions, such as plastic or liquid coating compositions and particularly molding compositions containing derivatives of cellulose wherein various ethers and halo-ethers of di-, tri-, and tetra-ethylene glycol are employed as plasticizers.

Still another object of this invention is the preparation of plastic compositions containing the above-mentioned plasticizers which will retain their plastic properties at relatively low temperatures.

Other objects of our invention will appear from the following detailed description.

In order to obtain softness, pliability and other desirable properties in plastics, films, textiles and other materials containing derivatives of cellulose, it is customary to combine therewith certain agents which have a solvent power for said cellulose derivatives. Said softening or plasticizing agents may be used in varying quantities depending upon the particular cellulose derivative employed and the uses to which the composition is to be put. In some cases the softening agent may have such a solvent power that it may be combined in relatively large amounts as compared to the amount of cellulose derivative itself. While relatively large amounts of plasticizers may be combined with the cellulose derivatives at ordinary temperatures, such compositions may be worthless at low temperatures due to the solubility and solvent characteristics of said plasticizing and softening agents being quite different at low temperatures. Under such conditions these agents showing little or no solvent power for the cellulose derivatives will separate out or exude when the composition is subjected or exposed to low temperatures.

We have now discovered that certain polyglycol derivatives, and particularly those of di-, tri-, and tetra-ethylene glycol have the unusual and unexpected property of increasing in solvent power for said cellulose derivatives with decreasing temperatures. Even at extremely low temperatures said glycol derivatives are excellent solvents, swelling agents, plasticizers or softening agents for cellulose derivatives.

The glycol derivatives which are found to be especially suitable as low temperature plasticizers are the diaryl-ethers of diethylene glycol, mono-aryl halo-ethers of diethylene glycol and the mixed alkyl-aryl ethers of diethylene glycol as well as the corresponding ethers and halo-ethers of triethylene glycol and tetra-ethylene glycol.

The compounds suitable for use in our invention may be prepared by reacting a di-halo-diethylene glycol viz., dichlo-diethyl ether, or the corresponding di-halo-triethylene or tetra-ethylene glycol with sodium alcoholates, for example, sodium methylate or sodium ethylate, or with the sodium salts of phenolic compounds such as sodium phenate and sodium naphtholate, or the sodium salts of the cresols, xylenols, or polyhydric phenols such as resorcinol, pyrogallol, hydroquinone, phloroglucinol, etc. depending upon the particular ether desired. Where it is desired to replace only one of the halogen atoms and to obtain a glycol halo-ether, only one mol equivalent of the sodium compound is reacted with one mol of the di-halo-polyglycol ether. Where it is desired to prepare the di-ether, two mols of the sodium compound are reacted with one mol of the di-halo-polyglycol ether. If, on the other hand, a mixed ether is desired, one mol equivalent of the di-halo-polyglycol ether is reacted with one mol each of the corresponding sodium compound, such as, for example, sodium methylate and sodium phenate. The compounds may be isolated from by-products and unreacted components by fractional distillation, etc.

Among the compounds which may be employed in our invention as suitable low temperature plasticizers are the diphenyl ether of diethylene glycol, the mixed methyl phenyl ether of diethylene glycol, the phenyl chloro-ether of diethylene glycol, the phenyl chloro-ether of tetraethylene glycol, and the methyl phenyl ether of tetra-ethylene glycol.

Any suitable derivative of cellulose may be employed in conjunction with the above-mentioned glycol derivative compounds, such as cellulose nitrate, but we prefer to employ organic derivatives of cellulose such as organic acid esters of cellulose or cellulose ethers. Examples of organic acid esters of cellulose are cellulose acetate, cellulose propionate, cellulose butyrate and mixed esters such as the acetate-propionate, while examples of cellulose ethers are ethyl cellulose, methyl cellulose and benzyl cellulose. There may also be employed mixed cellulose ethers or esters, such as cellulose acetate-nitrate, cellulose acetate-butyrate, or mixtures of cellulose derivatives, such as a mixture of cellulose acetate and cellulose nitrate.

Plastic compositions containing the cellulose derivative and the polyglycol ether or halo-ether may be prepared in any suitable manner and in any suitable mixing apparatus. These compositions may be worked up into films, sheets, rods, tubes, blocks or any other desired shape.

Molding powder or other compositions containing the derivative of cellulose and the poly-glycol ether or halo-ether in intimate association, but containing little or no volatile solvent, may be made, and these powders may be molded under heat and pressure to any desired shape.

Filaments, yarns and other textile materials may be made from solutions containing organic derivatives of cellulose and the poly-glycol ethers or halo-ethers by extrusion through orifices into an evaporative atmosphere, as in dry spinning, or into a precipitating bath as in wet spinning.

Solutions of the organic derivative of cellulose and the polyglycol ethers or halo-ethers in a volatile solvent may be cast or extruded onto a smooth surface and the volatile solvent permitted to evaporate to form films that may be used for photographic or other purposes. Since the flexibility and pliability characteristics of plastic compositions containing said polyglycol ethers or halo-ethers are not only retained but are in fact enhanced at low temperatures, these agents are especially suitable for the preparation of plastic compositions which are to be used where extremes of temperature are encountered. Examples of such uses are in the preparation of decorative parts on automobiles, in steering wheel material, etc. and in the manufacture of laminated glass wherein a plastic sheet containing a cellulose derivative and said poly-glycol ethers or halo-ethers is interposed between sheets of glass. Coating compositions such as lacquers may be formed containing the cellulose derivative and the poly-glycol ether or halo-ether dissolved in appropriate solvent mixtures, and resins, either synthetic or natural, compatible with the derivative of cellulose may be added thereto.

The proportion of poly-glycol ether or halo-ether to the derivative of cellulose will vary with the particular cellulose derivative and the particular ether. Also it will vary with the use to which the composition is to be put. However, the esters may be employed in proportions up to about 70% or more on the weight of the derivative of cellulose. In the case of cellulose acetate, the plasticizer is compatible in about 66% of the weight of cellulose acetate.

In making the compositions in accordance with our invention, the poly-glycol ether or halo-ether may be employed as the sole plasticizing agent, or it may be used in conjunction with other plasticizers such as triacetin, triglyceryl propionate, dibenzyl tartrate, diethyl tartrate, dibutyl tartrate, dimethyl phthalate, diethyl phthalate, the phthalate of the mono methyl ether of ethylene glycol, triphenyl phosphate or with other poly-glycol ethers or halo-ethers.

In making these compositions, solvents of appropriate nature, such as acetone, methyl acetate ethylene formal, ethyl lactate, formal glycerol, diacetone alcohol, of varying boiling points may be used to suit the particular requirements. Effect materials such as pigments, filling materials or dyes may be added to produce any desired effect.

In order to illustrate our invention, but without being limited thereto, the following examples are given:

*Example I*

100 parts of cellulose acetate are mixed with 60 parts of the chlor-phenoxy ether of tetraethylene glycol and thoroughly homogenized by kneading and mixing on hot rolls. A volatile solvent such as acetone or methyl ethyl ketone may be used to aid in obtaining a uniform composition. The homogeneous plastic mass is then cast into a film on a polished surface in the usual manner. When tested at 0° C. this film is far less brittle than a film similarly made with a plasticizer such as dimethoxy ethyl phthalate.

*Example II*

100 parts of cellulose acetate are mixed with 30 parts of the methyl phenyl ether of diethylene glycol and mixed on heated rolls. When completely reduced to a soft plastic mass, the material is fed to an injection molding machine and a decorative handle for the ice-cube tray of a refrigerator is molded under pressure. When this molded article is maintained below 0° C. for a prolonged period of time there is no apparent separation of the plasticizer from the cellulose acetate base.

*Example III*

100 parts of cellulose acetate are compounded with 40–50 parts of the methyl phenyl ether of tetraethylene glycol and the plastic mass is cast into thin sheets suitable for the manufacture of laminated glass. When the cellulose acetate composition is bonded under heat and pressure between two sheets of glass, a very desirable product is obtained which is very stable at extremely low temperatures.

It is to be understood that the foregoing detailed description is given merely by way of illustration and that many variations may be made therein without departing from the spirit of our invention.

Having described our invention, what we desire to secure by Letters Patent is:

1. A composition of matter comprising a derivative of cellulose selected from the group consisting of cellulose esters and ethers and a polyglycol ether of the following formula:

$$R-(O-CH_2CH_2)_n-X$$

wherein R is an aryl group, X is an alkoxy group, and $n$ is an integer of at least 2.

2. A composition of matter comprising a derivative of cellulose selected from the group consisting of cellulose esters and ethers and a polyglycol ether of the following formula:

$$R-(O-CH_2CH_2)_n-X$$

wherein R is an aryl group, X is an alkoxy group, and $n$ is an integer from 2 to 4 inclusive.

3. A composition of matter comprising an organic derivative of cellulose selected from the group consisting of cellulose esters of organic carboxylic acids and cellulose ethers and a poly glycol ether of the following formula:

$$R-(O-CH_2CH_2)_n-X$$

wherein R is an aryl group, X is an alkoxy group, and $n$ is an integer of at least 2.

4. A composition of matter comprising a derivative of cellulose selected from the group consisting of cellulose esters and ethers and a poly glycol ether of the following formula:

$$R—(O—CH_2CH_2)_n—OCH_3$$

wherein R is an aryl group and $n$ is an integer of at least 2.

5. A composition of matter comprising cellulose acetate and a poly glycol ether of the following formula:

$$R—(O—CH_2CH_2)_n—X$$

wherein R is an aryl group, X is an alkoxy group, and $n$ is an integer of at least 2.

6. A composition of matter comprising cellulose acetate and a poly glycol ether of the following formula:

$$R—(O—CH_2CH_2)_n—X$$

wherein R is an aryl group, X is an alkoxy group and $n$ is an integer from 2 to 4 inclusive.

7. A composition of matter comprising cellulose acetate and a poly glycol ether of the following formula:

$$R—(O—CH_2CH_2)_n—OCH_3$$

wherein R is an aryl group and $n$ is an integer of at least 2.

8. A composition of matter comprising cellulose acetate and the mixed methyl phenyl ether of diethylene glycol.

GEORGE W. SEYMOUR.
BLANCHE B. WHITE.